US009222382B2

(12) United States Patent
    Akama et al.

(10) Patent No.: US 9,222,382 B2
(45) Date of Patent: Dec. 29, 2015

(54) PARTICULATE MATTER PURIFYING MATERIAL, FILTER CATALYST FOR PURIFYING PARTICULATE MATTER USING PARTICULATE MATTER PURIFYING MATERIAL, AND METHOD OF REGENERATING FILTER CATALYST FOR PURIFYING PARTICULATE MATTER

(75) Inventors: Hiroshi Akama, Zushi (JP); Hitoshi Onodera, Yokosuka (JP); Toru Nishizawa, Fujisawa (JP); Yasunari Hanaki, Yokohama (JP); Hideaki Morisaka, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1153 days.

(21) Appl. No.: 13/130,348

(22) PCT Filed: Nov. 20, 2009

(86) PCT No.: PCT/JP2009/069689
    § 371 (c)(1),
    (2), (4) Date: May 20, 2011

(87) PCT Pub. No.: WO2010/058834
    PCT Pub. Date: May 27, 2010

(65) Prior Publication Data
    US 2011/0219748 A1    Sep. 15, 2011

(30) Foreign Application Priority Data
    Nov. 21, 2008 (JP) .................................. 2008-297932

(51) Int. Cl.
    *F01N 3/00*    (2006.01)
    *F01N 3/02*    (2006.01)
    (Continued)

(52) U.S. Cl.
    CPC .......... *F01N 3/0222* (2013.01); *B01D 46/0061* (2013.01); *B01D 46/2418* (2013.01);
    (Continued)

(58) Field of Classification Search
    CPC ............... B01J 2523/00; B01J 2523/18; B01J 2523/24; B01J 2523/36; B01J 2523/48; B01J 2523/56; B01J 2523/824; B01J 2523/828; B01J 2523/3712; B01J 23/002; B01D 2255/40; B01D 2255/206; B01D 2255/012; B01D 2255/908; B01D 46/0061; B01D 46/2418; B01D 53/944; F01N 3/0222; Y02T 10/20

USPC ............................................ 60/295, 297, 311
    See application file for complete search history.

(56) References Cited

U.S. PATENT DOCUMENTS 6,171,572 B1    1/2001  Aozasa
    6,528,451 B2    3/2003  Koranne et al.
    (Continued)

FOREIGN PATENT DOCUMENTS

CN    1854474 A      11/2006
    EP    0 955 267 B1    9/2003
    (Continued)

OTHER PUBLICATIONS

K. Harada et al., "Lowering Combustion Temperature of Carbon Particles on Pt-supported Ceria Series Oxides", Journal of Japan Petroleum Institute, vol. 48, No. 4, (2005), pp. 216-222.

*Primary Examiner* — Jesse Bogue
    *Assistant Examiner* — Diem Tran
    (74) *Attorney, Agent, or Firm* — Foley & Lardner LLP

(57) ABSTRACT

A particulate matter purifying material is used for a filter catalyst for purifying particulate matter that is disposed in an exhaust gas flow path of an internal combustion engine, traps the particulate matter in exhaust gas generated in the internal combustion engine, and burns the particulate matter to be deposited, so as to be regenerated. The particulate matter purifying material includes an oxide containing cerium (Ce) having an oxygen storage-release capacity, and at least one metal (Me) selected from the group consisting of Zr, Y, La, Pr, Sr, Nb and Nd, wherein a content ratio (Ce:Me) of cerium to the metal is 6:4 to 9:1 in terms of an atomic ratio, and a degree of crystallinity (CR) represented by the following formula (1) is within a range of 25 to 60%:

Degree of crystallinity $(CR) = I/I_0 \times 100(\%)$  (1)

wherein I represents an X-ray diffraction peak intensity with regard to a (111) plane of a $CeO_2$ phase in the particulate matter purifying material, and $I_0$ represents the X-ray diffraction peak intensity with regard to the (111) plane of the $CeO_2$ phase after the particulate matter purifying material is baked in air at 1000° C.

10 Claims, 4 Drawing Sheets

(51) Int. Cl.

| | |
|---|---|
| *F01N 3/022* | (2006.01) |
| *B01D 46/00* | (2006.01) |
| *B01D 46/24* | (2006.01) |
| *B01D 53/94* | (2006.01) |
| *B01J 23/00* | (2006.01) |
| *B01J 23/10* | (2006.01) |
| *B01J 23/20* | (2006.01) |
| *B01J 23/63* | (2006.01) |
| *B01J 23/648* | (2006.01) |
| *B01J 23/66* | (2006.01) |
| *C01F 17/00* | (2006.01) |
| *B01J 35/00* | (2006.01) |
| *B01J 35/04* | (2006.01) |
| *B01J 35/10* | (2006.01) |
| *B01J 37/03* | (2006.01) |

(52) U.S. Cl.
CPC ............. *B01D53/944* (2013.01); *B01J 23/002* (2013.01); *B01J 23/10* (2013.01); *B01J 23/20* (2013.01); *B01J 23/63* (2013.01); *B01J 23/6484* (2013.01); *B01J 23/66* (2013.01); *C01F 17/0043* (2013.01); *B01D 2255/206* (2013.01); *B01D 2255/40* (2013.01); *B01D 2255/908* (2013.01); *B01D 2258/012* (2013.01); *B01J 35/002* (2013.01); *B01J 35/04* (2013.01); *B01J 35/1014* (2013.01); *B01J 37/03* (2013.01); *B01J 2523/00* (2013.01); *C01P 2002/74* (2013.01); *C01P 2004/52* (2013.01); *C01P 2004/61* (2013.01); *C01P 2006/12* (2013.01); *Y02T 10/20* (2013.01)

(56) References Cited

U.S. PATENT DOCUMENTS

| | | | |
|---|---|---|---|
| 6,729,303 | B2 | 5/2004 | Itoyama et al. |
| 7,243,488 | B2 * | 7/2007 | Bonadies et al. ............... 60/295 |
| 7,431,910 | B2 | 10/2008 | Takao et al. |
| 7,964,527 | B2 | 6/2011 | Larcher et al. |
| 8,105,561 | B2 | 1/2012 | Hatanaka et al. |
| 2002/0173898 | A1 | 11/2002 | Itoyama et al. |
| 2006/0245985 | A1 | 11/2006 | Harada et al. |
| 2007/0264174 | A1 | 11/2007 | Willigan et al. |
| 2007/0264486 | A1 * | 11/2007 | Verdier ....................... 428/315.5 |
| 2010/0111789 | A1 | 5/2010 | Fajardie et al. |

FOREIGN PATENT DOCUMENTS

| | | |
|---|---|---|
| EP | 1 920 831 A2 | 5/2008 |
| IN | 4253/CHENP/2008 | 3/2009 |
| JP | 04-042063 B2 | 7/1992 |
| JP | 08-291705 A | 11/1996 |
| JP | 2004-016931 A | 1/2004 |
| JP | 3560408 B2 | 6/2004 |
| JP | 3613669 B2 | 11/2004 |
| JP | 2006-275020 A | 10/2006 |
| JP | 2006-326573 A | 12/2006 |
| JP | 3918402 B2 | 2/2007 |
| RU | 2 286 209 C2 | 10/2006 |
| RU | 2311956 C2 | 12/2007 |
| WO | WO 2007/093593 A1 | 8/2007 |
| WO | WO 2007/111004 A1 | 10/2007 |
| WO | WO 2008/025753 A2 | 3/2008 |

* cited by examiner

PARTICULATE MATTER PURIFYING MATERIAL, FILTER CATALYST FOR PURIFYING PARTICULATE MATTER USING PARTICULATE MATTER PURIFYING MATERIAL, AND METHOD OF REGENERATING FILTER CATALYST FOR PURIFYING PARTICULATE MATTER

TECHNICAL FIELD

The present invention relates to a particulate matter purifying material capable of purifying, with high efficiency, particulate matter included in exhaust gas from an internal combustion engine driving under a lean burn condition, relates to a filter catalyst for purifying particulate matter using the particulate matter purifying material, and further relates to a method of regenerating a filter catalyst for purifying particulate matter.

BACKGROUND ART

In recent years, in consideration of a global environment, a reduction in carbon dioxide ($CO_2$) emissions has been highly desired. Therefore, enhancements of a lean burn operation are being made in order to achieve better fuel consumption of an internal combustion engine of a vehicle.

Exhaust gas emitted from a lean-burn gasoline engine, a direct-injection engine or a diesel engine contains a lot of oxygen. Thus, a conventional three-way catalyst can hardly reduce and purify nitrogen oxide (NOx). Further, when particulate matter is discharged, a common monolithic catalyst cannot purify the particulate matter. Particularly, in order to sufficiently purify exhaust gas emitted from the diesel engine, not only NOx but also particulate matter (PM) are necessarily purified. Therefore, advances are being made in the development for purification of exhaust gas in various ways.

One of the effective methods for purifying PM is to trap PM emitted from an internal combustion engine using a filter. In this case, since a pressure loss increases as the amount of the PM deposited on the filter increases, the filter is necessarily heated up to burn and remove the PM. In the present circumstances, the filter is required to be heated to at least 600° C. or more so as to remove the deposited PM quickly to regenerate the filter. In order to further increase a burning rate of the PM to regenerate the filter for a short time, the filter is necessarily heated to 650° C. or more.

In this case, a large amount of fuel is supplied to the internal combustion engine, so as to increase an exhaust gas temperature. In addition, unburned fuel is discharged from the internal combustion engine to be burned by an oxidation catalyst provided in the front portion of the filter, so as to increase the exhaust gas temperature. However, such an operation causes a decrease in fuel consumption. Moreover, the deposited PM is burned in a self chain reaction at such a high temperature. Therefore, thermal runaway is caused when the PM is excessively deposited, and as a result, the filter may be damaged.

In order to burn PM deposited on a filter effectively at a lower temperature, various ways to support a catalyst component on a filter have been attempted (for example, refer to Patent Literature 1).

However, the catalyst component supported on the filter is solid, and the PM to be removed is also solid. Since a rate of contact between the solid substances is low, it is difficult to obtain a sufficient effect of reaction promotion. Therefore, for example, a suggestion to promote PM burning by causing a concentration gradient of the catalyst component to be supported has been proposed (for example, refer to Patent Literature 2).

When an excessively large amount of a catalyst is supported on a filter in order to promote PM burning, pores of the filter are blocked, and a pressure loss is thus increased. Thus, a suggestion to adjust a porosity, a pore diameter and the catalyst coated amount of the filter has been also proposed (for example, refer to Patent Literature 3).

In addition, a suggestion to prevent thermal runaway when a large amount of PM is deposited on a filter has been proposed. For example, a suggestion to control the introduction amount of air when PM is burned has been proposed (for example, refer to Patent Literature 4).

Moreover, researches for materials capable of starting burning PM at a lower temperature have been advanced. For example, various types of components are added based on cerium, and the amount of the components to be added is controlled, so as to enhance low temperature activation (for example, refer to Patent Literature 5).

CITATION LIST

Patent Literature

Patent Literature 1: Japanese Patent Examined Publication No. H04-42063
Patent Literature 2: Japanese Patent No. 3613669
Patent Literature 3: Japanese Patent No. 3560408
Patent Literature 4: Japanese Patent Unexamined Publication No. H08-291705
Patent Literature 5: Japanese Patent Unexamined Publication No. 2006-326573

SUMMARY OF INVENTION

However, according to the above-mentioned prior arts, a catalyst is mostly used only for ignition of PM. Therefore, when a large amount of PM is deposited, the deposited PM is burned in a self chain reaction mode, and an excessive increase in temperature is thus promoted. Further, thermal degradation of the catalyst is promoted associated with the promotion of the excessive increase in temperature. As a result, a problem of a decrease of the catalyst effect may be caused.

In the above-mentioned suggestion with regard to the material, although the effect of improvement of the low temperature activation in the case of highly mixing catalyst powder with PM is described, an effect when the catalyst powder is actually supported on the filter is not clarified. Namely, since the PM and the catalyst powder are both solid in the actual filter, it is difficult to enhance a rate of contact between the PM and the catalyst powder. Thus, it is not unclear whether the effect of the improvement of the low temperature activation can be achieved sufficiently.

As described above, the conventional filter catalysts are ignition means for causing self chain reaction burning at a lower temperature. Therefore, there is a problem to cause thermal degradation of the catalysts since the burning control is difficult.

In addition, there is a possibility that the PM may not be burned completely depending on the PM deposition distribution on the filter. Further, even though a catalyst material having an excellent activation property at a low temperature is used, a rate of contact between the PM and the catalyst material that are both solid is low when these are supported on an actual filter, and the sufficient action thereof cannot be achieved. Therefore, the filter catalyst is necessarily subjected to a high temperature condition forcibly to burn the PM completely. As a result, the conventional problems such as a decrease in fuel consumption and thermal runaway of the filter catalyst still remain.

The present invention has been made in view of such conventional problems. It is an object of the present invention to provide a particulate matter purifying material that has an excellent PM purifying property and is capable of starting purifying PM at a low temperature and preventing thermal runaway in a filter catalyst, a filter catalyst for purifying particulate matter using the particulate matter purifying material, and a method of regenerating the filter catalyst for purifying the particulate matter.

A particulate matter purifying material according to a first aspect of the present invention is used for a filter catalyst for purifying particulate matter that is disposed in an exhaust gas flow path of an internal combustion engine, traps the particulate matter in exhaust gas generated in the internal combustion engine, and burns the particulate matter to be deposited, so as to be regenerated. The particulate matter purifying material includes: an oxide containing: cerium (Ce) having an oxygen storage-release capacity; and at least one metal (Me) selected from the group consisting of zirconium (Zr), yttrium (Y), lanthanum (La), praseodymium (Pr), strontium (Sr), niobium (Nb) and neodymium (Nd), wherein a content ratio (Ce:Me) of cerium to the metal is 6:4 to 9:1 in terms of an atomic ratio, and a degree of crystallinity (CR) represented by the following formula (1) is within a range of 25 to 60%:

$$\text{Degree of crystallinity } (CR) = I/I_0 \times 100 (\%) \quad (1)$$

wherein I represents an X-ray diffraction peak intensity with regard to a (111) plane of a $CeO_2$ phase in the particulate matter purifying material, and $I_0$ represents the X-ray diffraction peak intensity with regard to the (111) plane of the $CeO_2$ phase after the particulate matter purifying material is baked in air at 1000° C.

A filter catalyst for purifying particulate matter according to a second aspect of the present invention is disposed in an exhaust gas flow path of an internal combustion engine, traps the particulate matter in exhaust gas generated in the internal combustion engine, and burns the particulate matter to be deposited, so as to be regenerated. The filter catalyst for purifying particulate matter includes: a filter substrate made of porous ceramics having continuous fine pores; and a catalyst layer formed on a wall of the filter substrate. The catalyst layer contains: 25 to 100 g/L of a mixture of the particulate matter purifying material and noble metal; and 0.25 to 1.0/L of the noble metal, per unit volume of the filter substrate.

A method of regenerating a filter catalyst for purifying particulate matter according to a third aspect of the present invention includes: preparing the filter catalyst for purifying particulate matter; and controlling an inner temperature of the filter catalyst to be 800° C. or less, thereby burning and removing deposited particulate matter on the filter catalyst.

DESCRIPTION OF EMBODIMENTS

[Particulate Matter Purifying Material]

Figure 1:
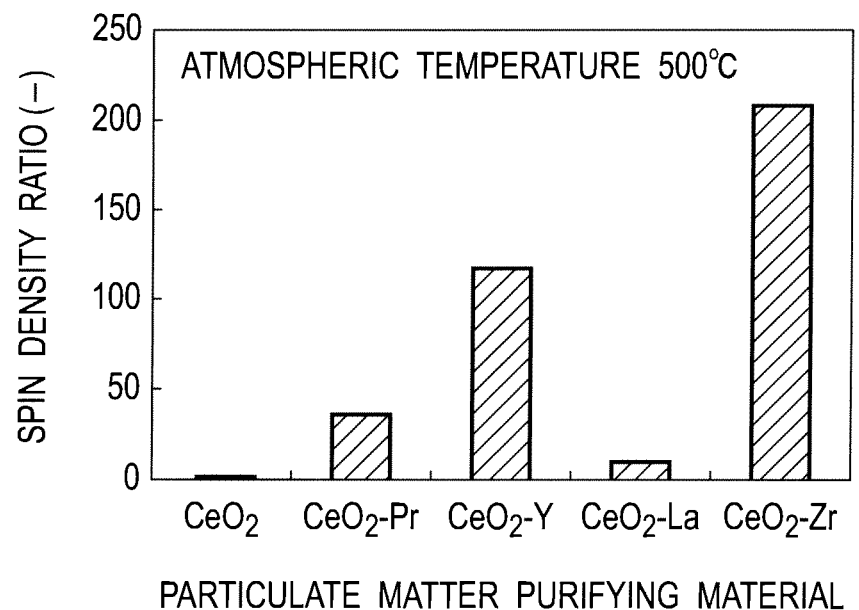
FIG. 1 is a graph showing the emission amount of active oxygen from a $CeO_2$-Me based PM purifying material.

A description will be made below in detail of a particulate matter purifying material (PM purifying material) according to the present embodiment. The particulate matter purifying material of the present embodiment is used for a filter catalyst. The filter catalyst is disposed in an exhaust gas flow path of an internal combustion engine, traps PM in exhaust gas generated in the internal combustion engine, and burns and removes the deposited PM, so that the filter catalyst is regenerated.

The particulate matter purifying material includes an oxide of cerium (Ce) having an oxygen storage-release capacity, more specifically, includes a cerium dioxide ($CeO_2$) as a main component and an oxide of metal (Me). A content ratio of cerium (Ce) to metal (Me) in the particulate matter purifying material is Ce:Me=6:4 to 9:1 in terms of an atomic ratio. Examples of metal (Me) include zirconium (Zr), yttrium (Y), lanthanum (La), praseodymium (Pr), strontium (Sr), niobium (Nb) and neodymium (Nd), and an arbitrary combination thereof.

In addition, the particulate matter purifying material has a degree of crystallinity within a range of 25 to 60%. The degree of crystallinity is represented by the following formula (1).

$$\text{Degree of crystallinity } (CR) = I/I_0 \times 100 (\%) \quad (1)$$

In the formula (1). I represents an X-ray diffraction peak intensity with regard to a (111) plane of a $CeO_2$ phase in the particulate matter purifying material. $I_0$ represents an X-ray diffraction peak intensity with regard to the (111) plane of the $CeO_2$ phase after baking the particulate matter purifying material at 1000° C. in air, typically, after baking the particulate matter purifying material at 1000° C. in air for five hours. Note that, the X-ray diffraction peak with regard to the (111) plane of the $CeO_2$ phase is a peak at approximately $2\theta=28.5$ deg.

The cerium oxide and the oxide of metal (Me) in the particulate matter purifying material according to the present embodiment may be present in a state in which cerium oxide particles and metal oxide particles are simply and physically mixed together. Alternatively, the cerium oxide and the metal oxide may be present in a state in which metal oxide fine particles are dispersed on the surfaces and peripheries of the cerium oxide particles. Further, the cerium oxide and the metal oxide may be present in a state of a composite oxide in which a part of a cerium site in a crystal lattice of the cerium oxide is substituted by an atom of the metal.

The $CeO_2$ phase represents not only the cerium oxide ($CeO_2$) itself but also a portion having a crystal structure of $CeO_2$, including a portion in which the metal atom is inserted into the $CeO_2$ crystal lattice. It is assumed that an agent in the particulate matter purifying material according to the present embodiment is the portion in which a part of the cerium site in the $CeO_2$ crystal structure is substituted by the metal atom.

The degree of crystallinity (CR) is a parameter with regard to a degree of maturity of a crystal structure of the $CeO_2$-Me based composite oxide. The inventors have found that the degree of crystallinity is an important property parameter to define a PM burning ability achieved by the $CeO_2$-Me based composite oxide.

The PM purifying material according to the present embodiment uses $CeO_2$ as a base material as described above. It is assumed that active oxygen species such as $O_2^-$ are emitted from the PM purifying material, so that PM present in the periphery thereof is burned. In addition, it is assumed that a second component and further a third component are added to $CeO_2$, thereby increasing the emission amount of such active oxygen species. Non Patent Literature 1 teaches that powder of a $CeO_2$-Me based material and powder of PM are mixed thoroughly, and the PM is burned under a lean condition with a 10% oxygen concentration, so that an ignition temperature of the PM is decreased by several tens of degrees compared to the case of using $CeO_2$ independently.

[Non Patent Literature 1] K. Harada, Y. Tsushio, A. Takami, Journal of the Japan Petroleum Institute, 48, (4), 216 (2005)

FIG. 1 shows a result of a measurement of the amount of active oxygen generated from the respective $CeO_2$-Me composite oxides at 500° C. in a nitrogen atmosphere using an electron spin resonance method (ESR method). All the materials have an increased spin density ratio of $O_2^-$ active species in contrast to $CeO_2$ as a base material. In other words, when a spin density when $CeO_2$ is used independently is to be 1, a spin density of cerin to which praseodymium (Pr), yttrium (Y), lanthanum (La) or zirconium (Zr) is added is increased. Especially, when yttrium (Y) and zirconium (Zr) are added, the spin densities are greatly increased. Thus, it is recognized that the decrease of the PM burning temperature due to the addition of the second component causes the increase of the emission amount of the active oxygen species. Namely, as described above, it is assumed that the PM purifying material emits active oxygen, thereby burning the PM present in the periphery thereof.

However, the inventors encountered the phenomenon that the temperature at the time of burning PM was not decreased as in the case of the powder in Non Patent Literature when each of the PM purifying materials was applied to a filter catalyst having an actual size. In view of this, the inventors considered that it was not sufficient only to increase the amount of active oxygen in a low temperature region in order to further decrease the PM burning temperature, and that a decrease in temperature with regard to the active oxygen emission property was required.

The inventors searched various parameters in order to decrease the PM burning temperature. As a result, the inventors recognized that it was not sufficient to simply add the second and third components to $CeO_2$ as a main component, and therefore, focused on the degree of crystallinity of $CeO_2$ having an oxygen storage capacity and arrived at the conclusion that controlling the degree of crystallinity was effective for decreasing the PM burning temperature.

Figure 2:
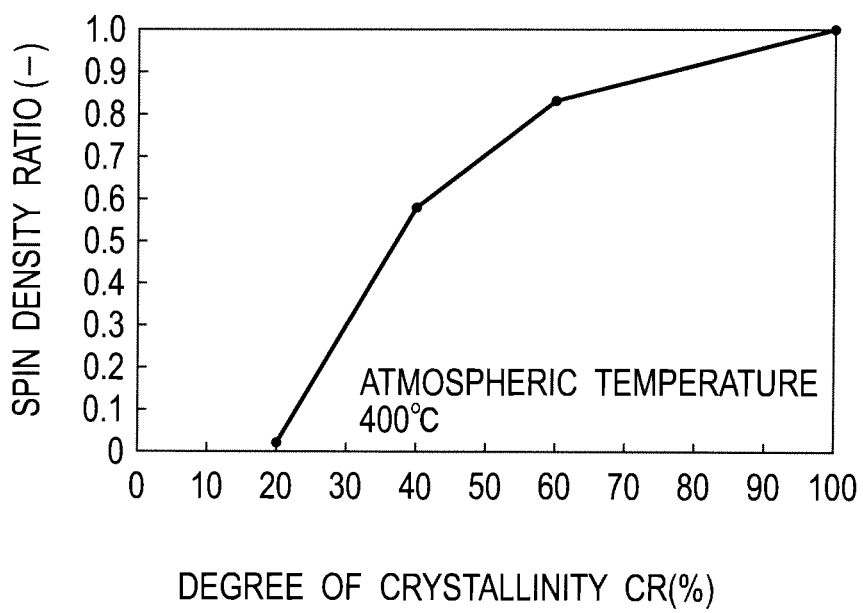
FIG. 2 is a graph showing a relationship between a degree of crystallinity obtained by an X-ray diffraction characteristic in a $CeO_2$ (111) plane and the emission amount of active oxygen (spin density ratio) with regard to a $CeO_2$—Pr composite oxide.

The degree of crystallinity (CR) as a scale with regard to a crystalline property of $CeO_2$ can be changed when, for example, the baking temperature of $CeO_2$ varies. Here, an emission property of the active oxygen species $O_2^-$ in the PM purifying material in which the degree of crystallinity was changed by baking the PM purifying material at a different temperature in an electric furnace was investigated. Namely, a spin density of $O_2^-$ was examined at a relatively low temperature (400° C.) by the ESR method with regard to praseodymium-added ceria ($CeO_2$—Pr) in which a degree of crystallinity was controlled by baking the praseodymium-added ceria at a different temperature in air. FIG. 2 is a graph showing a relationship between the degree of crystallinity of the praseodymium-added ceria and the spin density of $O_2^-$ active species in the case of the atmospheric temperature of 400° C. FIG. 2 shows a case where the degree of crystallinity of the praseodymium-added ceria baked at 1000° C. in air is 100, and the spin density ratio is based on a value of a material having a degree of crystallinity of 100. As shown in FIG. 2, it is recognized that the emission amount of active oxygen (spin density ratio) is increased as a material has a higher degree of crystallinity. Note that, the calculation of the degree of crystallinity focuses on the (111) plane to be a main peak of X-ray diffraction (XRD) as a specific crystalline plane of $CeO_2$ as described above.

Next, approximately 0.45% by mass of platinum (Pt) was supported on powder of the praseodymium-added ceria with the controlled degree of crystallinity, so as to prepare Pt/$CeO_2$-Me. Then, approximately 50 g/L of the supported powder was supported on a typical alternately blocked cordierite filter substrate (diesel particulate filter) having a porosity of 56%, so as to prepare a filter catalyst. Then, the filter catalyst was installed in an exhaust gas piping system of a diesel engine to trap a certain amount of PM, followed by gradually increasing an exhaust gas temperature, thereby evaluating a PM burning start temperature and a PM burning rate. According to the result, it is recognized that the effect of decreasing the PM burning start temperature is enhanced as the degree of crystallinity is higher, and confirmed that the degree of crystallinity of the material is an important factor.

However, when investigating more specifically, it is recognized that the relationship between the degree of crystallinity of the material and the emission property of the active oxygen species $O_2^-$ and the PM burning property as shown in FIG. 2 is not necessarily applied to the case in which an actual filter catalyst is used in actual exhaust gas. Namely, in the actual filter catalyst, it is recognized that the PM burning property is not necessarily improved as the degree of crystallinity of the PM purifying material is higher, and there is an optimal value for the degree of crystallinity with respect to the PM burning property (see FIG. 5). According to the above definition of the degree of crystallinity (CR) of the material obtained by the test data of FIG. 5, the degree of crystallinity of the PM purifying material is preferably within a range of 25 to 60%, more preferably within a range of 40 to 55%. When the degree of crystallinity exceeds 60%, the PM burning property is rapidly degraded.

As a material characteristic factor strongly related to the degree of crystallinity, a crystallite diameter (D) derived from an XRD result may be used. The crystallite diameter (D) is obtained by Scherrer's equation represented by the following formula (2).

$$D = \lambda/\beta \cos \theta \, (\text{nm}) \qquad (2)$$

In the formula, $\lambda$ represents a measuring X-ray wavelength (nm). $\beta$ represents a diffraction line width according to a crystallite dimension, that is, a full width at half maximum $\beta_{1/2}$ (radian) of the diffraction line. $\theta$ represents a Bragg angle of the diffraction line. According to the X-ray diffraction peak in the specific crystalline plane (111) of $CeO_2$ of the PM purifying material, the crystallite diameter (D) obtained by use of the formula (2) is preferably within a range of 10 nm to 22 nm. The crystallite diameter (D) is more preferably within a range of 15 nm to 20 nm in terms of the relationship with the degree of crystallinity (CR).

Here, the presence of the optimal values of the degree of crystallinity and the crystallite diameter of the material signifies a presence of another factor conflicting with those. That is a specific surface area. The specific surface area of the PM purifying material according to the present embodiment is preferably within a range of 15 to 55 $m^2/g$, more preferably within a range of 20 to 35 $m^2/g$. The specific surface area is inversely proportional to the degree of crystallinity. In the $CeO_2$-Me based material, when the specific surface area is 15 $m^2/g$ or less, the degree of crystallinity exceeds 60%. Although such a case may be preferable in view of active oxygen emission, the PM burning property is degraded in the actual filter catalyst. The reason for this is not definite; however, it is assumed that when the specific surface area is decreased, the dispersion process to supply generated active oxygen to PM may be affected adversely.

The present embodiment uses $CeO_2$ as a compound having an oxygen storage-release capacity, as described above. In addition, as an oxide obtained by the addition of metal (Me), an oxide material having a so-called perovskite structure may also be used. For example, an La—K—MnO based composite oxide may be used.

A method for manufacturing a $CeO_2$-Me based material for the PM purifying material according to the present embodiment may employ various manufacturing methods. Particularly, a coprecipitation method is a typical method for manufacturing the PM purifying material. For example, nitrates, carbonates or acetates of cerium and each metal described above are dissolved in water and mixed thoroughly. Then, alkaline material is added to the mixture to produce a coprecipitated substance, followed by washing, filtering, drying and baking, so as to obtain the PM purifying material.

More specifically, in the case of a $CeO_2$—Zr composite oxide, a mixed aqueous solution of cerium nitrate and zirconium nitrate is first prepared. Next, a basic aqueous solution such as diluted ammonia water or urea water is added to the mixed aqueous solution, so as to obtain a coprecipitated substance. Then, the coprecipitated substance is washed with water, dried and baked, thereby obtaining the $CeO_2$—Zr composite oxide.

The degree of crystallinity of the $CeO_2$-Me based material may be controlled by the variation of the baking temperature in air, for example. Note that, the baking temperature is required to be adjusted appropriately depending on the material to be used and a method for forming the oxide.

[Filter Catalyst for Purifying Particulate Matter]

A description will be made below of a filter catalyst for purifying particulate matter according to the present embodiment. The PM purifying material as described above is supported on a filter substrate, thereby obtaining the filter catalyst for purifying particulate matter of the present embodiment. When the above-described PM purifying material is supported on an actual monolithic filter substrate to obtain the filter catalyst, the amount of the PM purifying material supported on the filter substrate is important for obtaining the property of the material sufficiently to promote the PM burning property. The filter substrate effective in the present embodiment is composed of porous ceramics having continuous fine pores, and various types of filter substrates (diesel particulate filters) made of silicon carbide, mullite, cordierite, or the like may be applied to the filter substrate of the present embodiment.

If the amount of the PM purifying material supported on the filter substrate is not sufficient, the absolute amount of active oxygen to be emitted is decreased. As a result, the PM burning property is degraded. On the other hand, if the supported amount of the PM purifying material is excessive, fine pores of the filter substrate are blocked although the amount of active oxygen is sufficient. Accordingly, a pressure loss is increased. Furthermore, PM does not enter the fine pores but are deposited and aggregated on the surface of the filter wall, and the PM cannot be burned under a low temperature condition such as 600° C. or less. If the temperature is increased to forcibly burn the PM, the deposited PM is burned in a self chain reaction, and thermal runaway may be caused. Thus, according to the present embodiment, it is effective to coat the filter substrate with 25 to 100 g of the PM purifying material including noble metal per litter of the filter substrate so as to provide a catalyst layer. In this case, the PM purifying material is preferably coated on the wall of the filter substrate made of porous ceramics having continuous fine pores, more preferably coated on the inner surfaces of the fine pores in the wall.

In addition, the filter catalyst for purifying PM according to the present embodiment preferably contains noble metal in the catalyst layer containing the PM purifying material. Preferable examples of noble metal are platinum (Pt), palladium (Pd) and silver (Ag), and a mixture thereof. A relatively small amount of noble metal to be supported, that is, within a range of 0.25 to 1.0 g per liter of the filter substrate is included in the catalyst layer, so as to improve the PM burning property.

The addition of noble metal is effective for improving a PM burning rate. It is to be noted that an excessive amount of noble metal is inefficient and useless, and may cause a decrease in durability. Thus, the supported amount of Pt, which is typical metal as noble metal, is preferably within a range of 0.3 to 0.7 g/L. Noble metal activates hydrocarbon (HC), carbon monoxide (CO) and nitrogen oxide (NOx) contained in exhaust gas, and helps emission of active oxygen from the PM purifying material. However, an excessive amount of noble metal may adversely affect such an action. Accordingly, 0.3 to 0.7 g/L of the supported amount is an effective range.

In the filter catalyst for purifying PM according to the present embodiment, platinum as noble metal, for example, is supported on powder of the $CeO_2$-Me based material with a relatively low concentration of 1.0% by mass or less. More specifically, approximately 0.5% by mass of platinum is supported on the powder so as to prepare Pt/$CeO_2$-Me powder. Then, an alternately blocked cordierite filter substrate having the cell number of 300 cell/$in^2$, a wall thickness of 12 mil, and a porosity of 56 to 62% is coated with the Pt/$CeO_2$-Me powder.

As described above, the supported amount of the PM purifying material including noble metal is within a range of 25 to 100 g/L, preferably within a range of 40 to 70 g/L. Namely, the catalyst layer contains 25 to 100 g/L of the mixture of the particulate matter purifying material and noble metal, and contains 0.25 to 1.0 g/L of noble metal. An average particle diameter of the particulate matter purifying material is preferably within a range of 0.1 μm to 5 μm. Due to such an average particle diameter, blocking of the fine pores of the filter substrate can be prevented while a relatively large supported amount is ensured. Accordingly, a pressure loss can be decreased while the PM burning property is improved. Note that, the average particle diameter of the particulate matter purifying material is a 50% cumulative particle diameter (D50) measured by a laser diffraction particle size distribution analyzer.

In order to provide the catalyst layer on the filter substrate, water, acid and a binder composed of silica or alumina is first added to catalyst powder (particulate matter purifying material and noble metal) so as to be slurried. Next, the slurry is poured into the filter substrate, followed by applying pressure to fill the fine pores of the filter substrate with the slurry and removing redundant slurry by airflow. Then, the filter substrate is dried and baked, thereby preparing the filter catalyst. In the present embodiment, the catalyst slurry is preferably provided to coat the inside of the fine pores evenly as much as possible.

Although the porosity of the filter substrate (diesel particulate filter) used in the present embodiment is effective within a range of 42 to 62%, the preferable range of the effective porosity varies depending on the material of the filter substrate. When the filter substrate is made of cordierite, the porosity is preferably within a range of 56 to 62%. When the filter substrate is made of silicon carbide (SiC), the porosity is preferably within a range of 42 to 56%. The filter substrates having such porosity ranges are commercially available and thus easily obtainable.

Figure 3:
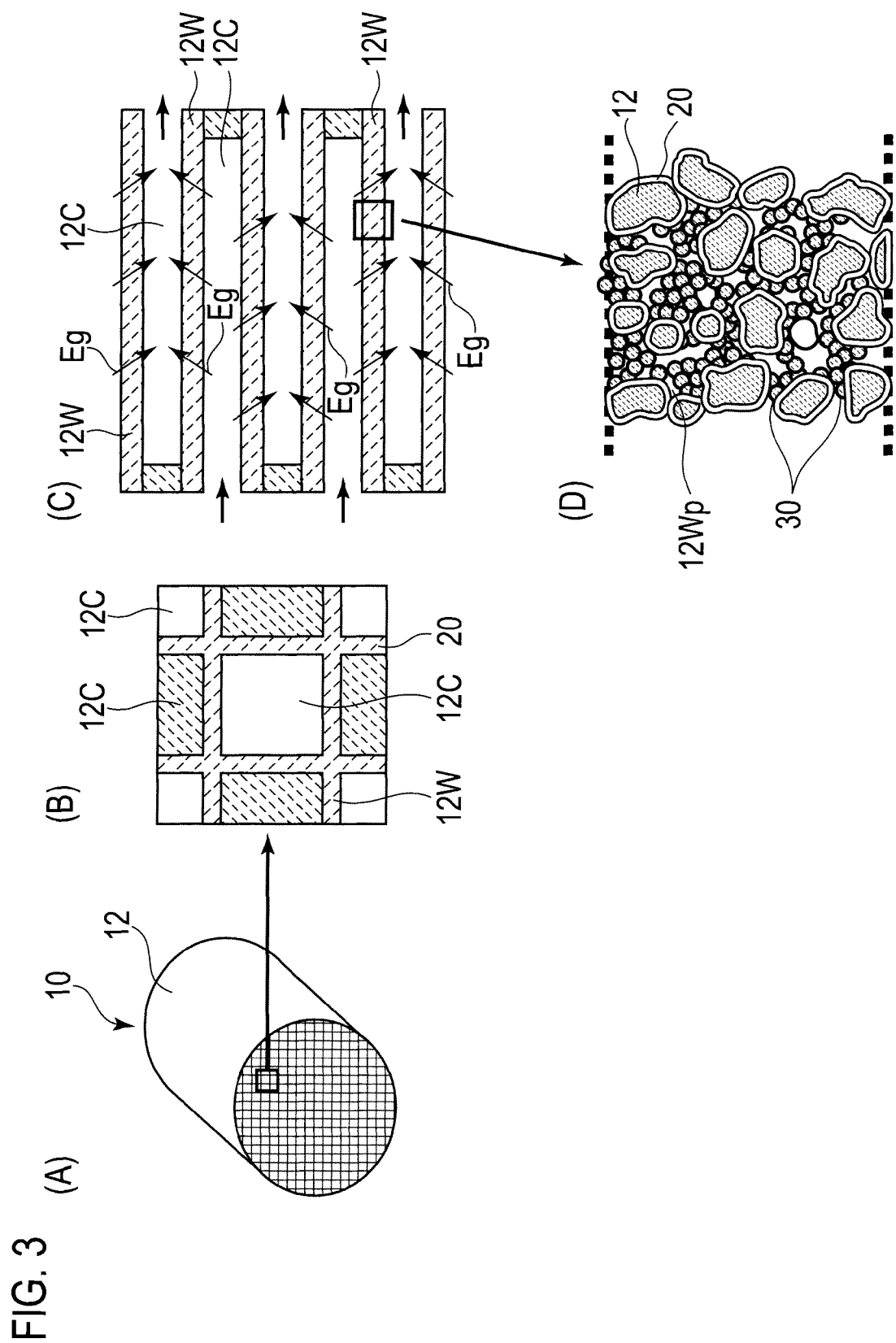
FIG. 3 is a perspective view and a cross-sectional view showing one example of a filter catalyst according to the embodiment of the present invention.

FIG. 3 shows one example of the filter catalyst according to the present embodiment. FIG. 3(A) is a perspective view of the filter catalyst, FIG. 3(B) is an enlarged view showing a side surface of the filter catalyst shown in FIG. 3(A), FIG. 3(C) is a cross-sectional view cut along a longitudinal direction of the filter catalyst shown in FIG. 3(A), and FIG. 3(D) is a partially enlarged cross-sectional view of a cell wall 12W shown in FIG. 3(C). In the figures, a filter catalyst 10 includes a filter substrate 12, and a catalyst layer 20 supported on the filter substrate 12. The filter substrate 12 is provided with a plurality of cells 12C that are segmented with the cell wall 12W, and the ends of the cells 12C in each side are alternately closed (blocked), so as to provide a so-called checkered honeycomb substrate (see FIGS. 3(B) and 3(C)).

As indicated by the arrows Eg in FIG. 3(C), exhaust gas enters the filter substrate 12 from the opened cells 12C at a cell inlet side of the filter substrate 12, flows into the adjacent cell 12C through a plurality of fine pores 12Wp of the cell wall 12W, and comes out of the opened cells at a cell outlet side. The cells 12C adjacent to each other are communicated via the fine pores 12Wp so that exhaust gas can flow between the adjacent cells while trapping PM. The reference numeral 30 represents PM (see FIG. 3(D)).

In the filter catalyst shown in FIG. 3, the catalyst layer 20 is formed in such a manner that a catalyst component is relatively evenly provided on the inner surfaces of the fine pores 12Wp of the cell wall. In addition, the catalyst layer 20 is provided also on the outer surface of the cell wall 12W (not shown in the figure). Thus, the present embodiment employs not only a surface filtration system in which the catalyst layer is formed mainly on the outer surface of the cell wall 12W, but also a depth filtration system in which the catalyst layer is formed in the fine pores 12Wp of the cell wall of the filter substrate. According to the filter catalyst of the present embodiment, the inside of the fine pores of the cell wall is effectively used for filtration much more than the outer surface of the cell wall. The combination of these systems further contributes to promote the property of the PM purifying material advantageously since the PM 30 is easily trapped in the fine pores of the cell wall. Note that, the PM purifying material according to the present embodiment may be used with the surface filtration system.

The filter catalyst as described above is installed in an exhaust system of a diesel engine. For example, an oxidation catalyst, the filter catalyst and a NOx trap catalyst are provided in this order from the upstream side in the exhaust system. The order of the filter catalyst and the NOx trap catalyst may be changed. In addition, the oxidation catalyst and the filter catalyst may be housed together in a single casing. Further, an oxidation catalyst component may be supported on some parts of the filter catalyst. The oxidation catalyst oxidizes hydrocarbon and carbon monoxide in exhaust gas. The NOx trap catalyst traps nitrogen oxide in the exhaust gas when an air-fuel ratio of the exhaust gas is lean, and the NOx trap catalyst releases and reduces the trapped nitrogen oxide when the air-fuel ratio of the exhaust gas is stoichiometric or rich.

Figure 4:
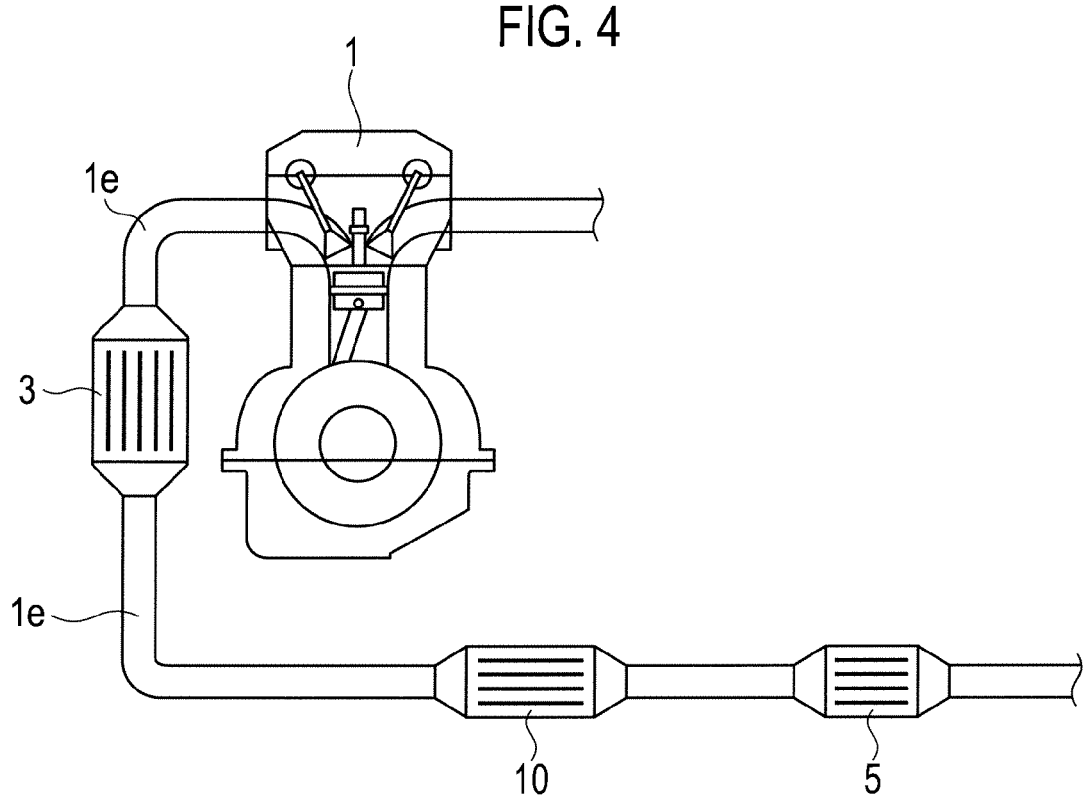
FIG. 4 is a system configuration diagram showing one example of an exhaust gas purifying system in which a filter catalyst according to the embodiment of the present invention is installed.

FIG. 4 is a system configuration diagram showing one example of an exhaust gas purifying system including the filter catalyst according to the present embodiment. From the upstream side of an exhaust gas flow path 1e of an engine 1, an oxidation catalyst 3, the filter catalyst 10 and a NOx trap catalyst 5 are placed in this order. In this system, the regeneration temperature of the filter catalyst 10 can be decreased to a lower temperature such as 550° C. or less. Therefore, even in the case where the filter catalyst 10 is provided upstream of the NOx trap catalyst 5, the filter catalyst 10 is hardly subjected to a high temperature, and thus, an influence of thermal degradation can be prevented.

[Method of Regenerating Filter Catalyst for Purifying Particulate Matter]

A description will be made below of a method of regenerating the filter catalyst for purifying particulate matter according to the present embodiment. The present invention is characterized in that the property of the PM purifying material is controlled, so as to achieve the PM burning property to the maximum. Thus, the usage of the filter catalyst is significantly important.

In the present embodiment, when the filter catalyst for purifying PM obtained as described above is actually installed in a vehicle, an inner temperature of the filter catalyst is preferably controlled to be 800° C. or less to burn and remove the deposited PM in the filter catalyst. This is because the degree of crystallinity and the specific surface area of the PM purifying material according to the present embodiment are required to be maintained within the effective ranges, respectively, when the filter catalyst is actually used. Namely, if the inner temperature of the filter catalyst exceeds 800° C., a crystal growth of $CeO_2$ in the PM purifying material is caused rapidly. As a result, a decrease in specific surface area may be promoted.

As for the process of the appropriate method of regenerating the filter catalyst for purifying particulate matter in use, the deposited amount of PM trapped by the filter catalyst is detected first. Next, at the time of burning and removing the PM when more than a certain amount of PM is deposited, a temperature of exhaust gas at an inlet of the filter catalyst is controlled to be within a range of 350 to 550° C., and an oxygen concentration in the exhaust gas flowing into the filter catalyst is controlled to be 8% or more. If the temperature of the exhaust gas at the inlet of the filter catalyst is less than 350° C., it is difficult to increase a burning rate of the PM. However, when using the PM purifying material according to the present embodiment, a burning efficiency of the PM may not be improved if the burning rate of the PM associated with the increase of the temperature of the exhaust gas becomes too high. In addition, if the temperature of the exhaust gas is increased to more than 600° C., the PM may be burned in a self chain reaction. As a result, various problems such as a rapid increase in temperature of the filter catalyst may be caused.

According to the regeneration method of the present embodiment, a high burning rate of PM can be obtained even under a relatively mild condition with a low temperature, and a high removal rate obtained by burning PM can be achieved.

Further, since the filter catalyst is not subjected to a high temperature, degradation of the filter catalyst can be prevented. Accordingly, extra fuel consumption and an adverse effect on engine oil due to high temperature can be suppressed.

Next, the regenerating method according to the present embodiment will be explained with reference to the example of the exhaust gas purifying system shown in FIG. 4. In the exhaust gas purifying system shown in FIG. 4, the inlet of the filter catalyst 10 may be provided with an oxygen control means not shown in the figure. The oxygen control means is not particularly limited as long as the oxygen control means have a function to control an oxygen concentration in exhaust gas in a similar manner to conventional means. The oxygen control means may be a combination of an exhaust gas recirculation device (EGR device) and an intake air variable device. Particularly, an effective method for operating the EGR device and the intake air variable device based on prediction controlling is disclosed in Japanese Patent No. 3918402. In addition, a method for introducing secondary air into the catalyst inlet while measuring an oxygen concentration of exhaust gas may be applied to the present embodiment. The above-mentioned methods may also be used in combination.

As described above, the exhaust gas purifying system according to the present embodiment controls the temperature of exhaust gas at the inlet of the filter catalyst 10 to be within a range of 350° C. to 550° C., and controls the oxygen concentration of the exhaust gas to be 8% or more. More specifically, a prediction measurement means for measuring the amount of trapped PM, such as a means to detect a pressure loss between front of and behind the filter catalyst 10, is provided in the system. That is, the means determines whether or not the pressure loss reaches a predetermined value after the deposition of the PM. When the pressure loss exceeds a predetermined value and a large amount of the PM is trapped, the system increases the temperature of exhaust gas, and holds the temperature until the pressure loss is decreased to a specified value, thereby regenerating the filter catalyst 10. The temperature of the exhaust gas at this time can be controlled by the optimization of the amount of post injection of the engine 1 and timing thereof.

However, there may be a case where each pressure loss between front of and behind the filter catalyst 10 is not increased contrary to expectations, and the PM is deposited excessively for some reason, for example, due to an operating condition of the engine. In such a case, in order to prevent thermal runaway caused by self chain reaction burning of the PM, a treatment (operation) to gradually increase the temperature of the exhaust gas may be performed after a relatively low temperature treatment is preliminarily performed. Moreover, even when the deposited PM is partially or totally burned in a self chain reaction mode because of the operating condition, the inner temperature of the filter catalyst 10 is monitored and EGR gas is supplied, thereby preventing the temperature of the filter catalyst 10 from increasing to more than 800° C.

The means to predict the amount of trapped PM described above is not particularly limited. As an example of the means to predict the amount of trapped PM, a control system apparatus including a central processing unit (CPU) storing characteristics maps associated with parameters such as a engine speed of an engine, an accelerator opening degree, load, and an exhaust gas temperature and exhaust gas amount may be used.

EXAMPLES

The following is a further specific explanation of the present embodiment with reference to examples. However, the scope of the present invention is not limited to these examples.

[Manufacture of Filter Catalyst 1]

(Manufacture of Particulate Matter Purifying Material ($CeO_2$—Pr))

First, cerium nitrate and praseodymium nitrate were dissolved in ion-exchanged water in such a manner that an atomic ratio of cerium to praseodymium was 7:3, so as to prepare a mixed aqueous solution. Next, diluted ammonia water was added to the mixed aqueous solution, followed by stirring, so as to obtain a coprecipitated substance. Then, the coprecipitated substance was filtered, washed with water, dried and baked, thereby preparing a $CeO_2$—Pr composite oxide.

Then, powder of the $CeO_2$—Pr composite oxide (Ce:Pr=7:3 (atomic ratio)) was baked in an electric furnace in air for five hours while varying temperatures, so as to obtain seven types of powders 1 to 7, each having different degree of crystallinity, crystallite diameters and specific surface areas as shown in Table 1. Table 1 shows the respective baking temperatures, degree of crystallinity, crystallite diameters and specific surface areas of the powders 1 to 7. The respective degree of crystallinity and the crystallite diameters were obtained by an X-ray diffraction peak in a (111) plane of a $CeO_2$ phase measured using an X-ray diffractometer. The specific surface areas were obtained by a gas adsorption method.

TABLE 1

|  | Ce:Pr (Atomic Ratio) | Baking Temperature (° C.) | Degree of Crystallinity (%) | Crystallite Diameter (nm) | Specific Surface Area (m²/g) |
| --- | --- | --- | --- | --- | --- |
| Powder 1 | 7:3 | 400 | 20 | 11 | 64 |
| Powder 2 | 7:3 | 500 | 30 | 15 | 50 |
| Powder 3 | 7:3 | 700 | 40 | 18 | 28 |
| Powder 4 | 7:3 | 730 | 49 | 19 | 26 |
| Powder 5 | 7:3 | 750 | 55 | 20 | 24 |
| Powder 6 | 7:3 | 830 | 65 | 30 | 15 |
| Powder 7 | 7:3 | 1000 | 100 | 46 | 6 |

(Manufacture of Particulate Matter Purifying Material ($CeO_2$—Nd))

First, cerium nitrate and neodymium nitrate were dissolved in ion-exchanged water in such a manner that an atomic ratio of cerium to neodymium was 7:3, so as to prepare a mixed aqueous solution. Next, diluted ammonia water was added to the mixed aqueous solution, followed by stirring, so as to obtain a coprecipitated substance. Then, the coprecipitated substance was filtered, washed with water, dried and baked, thereby preparing a $CeO_2$—Nd composite oxide.

Then, powder of the $CeO_2$—Nd composite oxide (Ce:Nd=7:3 (atomic ratio)) was baked in an electric furnace in air for five hours while varying temperatures, so as to obtain seven types of powders 8 to 14, each having different degree of crystallinity, crystallite diameters and specific surface areas as shown in Table 2. Table 2 shows the respective baking temperatures, degree of crystallinity, crystallite diameters and specific surface areas of the powders 8 to 14.

TABLE 2

|  | Ce:Nd (Atomic Ratio) | Baking Temperature (° C.) | Degree of Crystallinity (%) | Crystallite Diameter (nm) | Specific Surface Area (m²/g) |
|---|---|---|---|---|---|
| Powder 8 | 7:3 | 400 | 24 | 13 | 58 |
| Powder 9 | 7:3 | 500 | 32 | 16 | 46 |
| Powder 10 | 7:3 | 700 | 38 | 19 | 37 |
| Powder 11 | 7:3 | 730 | 44 | 20 | 31 |
| Powder 12 | 7:3 | 750 | 53 | 24 | 27 |
| Powder 13 | 7:3 | 830 | 59 | 28 | 20 |
| Powder 14 | 7:3 | 1000 | 100 | 50 | 5 |

(Formation of Catalyst Layer on Filter Substrate)

Next, 500 g of the respective powders 1 to 14 was impregnated with 550 g of a dinitrodiammine platinum (Pt) aqueous solution, and the mixture was stirred and dried to remove water, followed by baking in an electric furnace at 400° C. Thus, 0.45% by mass of Pt was supported on the respective powders 1 to 14. Next, 500 g of the respective 0.45% by mass Pt-supported powders 1 to 14 thus obtained and 2500 g of water were mixed. Then, the mixture was put into a magnetic ball mill made of alumina, followed by wet-milling so as to have an average diameter of 2.1 μm, thereby obtaining catalyst slurries 1 to 14 corresponding to the powders 1 to 14.

In addition, the powder 2 was subjected to the similar operation described above, thereby manufacturing a catalyst slurry 2' on which 1.2% by mass of Pt was supported.

Then, an alternately blocked cordierite honeycomb filter substrate having a porosity of 56% (diameter 5.66 inches, 2.5 L, 300 cpsi) was prepared. The filter, substrate was sprayed and coated with the respective catalyst slurries 1 to 14 and 2'. The redundant slurries were then removed by compressed airflow, followed by drying at 130° C. and baking at 400° C. for three hours. Thus, filter catalysts 1 to 14 and 2' in which approximately 50 g/L of a catalyst layer was formed on the filter substrate, respectively, were obtained.

[Manufacture of Filter Catalyst 2]

(Manufacture of Particulate Matter Purifying Material (CeO₂—Pr))

First, cerium nitrate and praseodymium nitrate were dissolved in ion-exchanged water in such a manner that an atomic ratio of cerium to praseodymium was 5:5, so as to prepare a mixed aqueous solution. Next, diluted ammonia water was added to the mixed aqueous solution, followed by stirring, so as to obtain a coprecipitated substance. Then, the coprecipitated substance was filtered, washed with water, dried and baked, thereby preparing a CeO₂—Pr composite oxide 1. In addition, CeO₂—Pr composite oxides 2 to 4 in which atomic ratios of cerium to praseodymium were 6:4, 9:1 and 9.5:0.5, respectively, were prepared in a similar manner to the CeO₂—Pr composite oxide 1.

Then, the CeO₂—Pr composite oxides 1 to 4 were baked in an electric furnace in air at 700° C. for five hours, so as to obtain four types of powders 15 to 18, each having different degree of crystallinity, crystallite diameters and specific surface areas as shown in Table 3.

TABLE 3

|  | Ce:Pr (Atomic Ratio) | Baking Temperature (° C.) | Degree of Crystallinity (%) | Crystallite Diameter (nm) | Specific Surface Area (m²/g) |
|---|---|---|---|---|---|
| Powder 15 | 5:5 | 700 | 33 | 17 | 46 |
| Powder 16 | 6:4 | 700 | 37 | 18 | 40 |
| Powder 17 | 9:1 | 700 | 44 | 19 | 30 |
| Powder 18 | 9.5:0.5 | 700 | 48 | 21 | 28 |

(Formation of Catalyst Layer on Filter Substrate)

First, 0.45% by mass of Pt was supported on the respective powders 15 to 18 in a similar manner to the above-described process. In addition, catalyst slurries 15 to 18 corresponding to the powders 15 to 18 were obtained in a similar manner to the above-described process. Then, a cordierite honeycomb filter substrate was coated with the respective catalyst slurries 15 to 18 in a similar manner to the above-described process, thereby obtaining filter catalysts 15 to 18 in which approximately 50 g/L of a catalyst layer was formed on the filter substrate, respectively.

[Manufacture of Filter Catalyst 3]

(Manufacture of Particulate Matter Purifying Material)

First, cerium nitrate and zirconium nitrate were dissolved in ion-exchanged water in such a manner that an atomic ratio of cerium to zirconium was 7:3, so as to prepare a mixed aqueous solution. Next, diluted ammonia water was added to the mixed aqueous solution, followed by stirring, so as to obtain a coprecipitated substance. Then, the coprecipitated substance was filtered, washed with water, dried and baked, thereby preparing a CeO₂—Zr composite oxide. In addition, a CeO₂—Y composite oxide, a CeO₂—La composite oxide, a CeO₂—Sr composite oxide, a CeO₂—Nb composite oxide and a CeO₂—Nd composite oxide were prepared using yttrium nitrate, lanthanum nitrate, strontium nitrate, niobium nitrate and neodymium nitrate, respectively, in a similar manner to the CeO₂—Zr composite oxide.

Then, the CeO₂—Zr composite oxide, the CeO₂—Y composite oxide, the CeO₂—La composite oxide, the CeO₂—Sr composite oxide, the CeO₂—Nb composite oxide and the CeO₂—Nd composite oxide were baked in an electric furnace in air at 700° C. for five hours, so as to obtain four types of powders 19 to 24, each having different degree of crystallinity, crystallite diameters and specific surface areas as shown in Table 4.

TABLE 4

|  | Composition of Composite Oxide | Baking Temperature (° C.) | Degree of Crystallinity (%) | Crystallite Diameter (nm) | Specific Surface Area (m²/g) | Noble Metal Type | Noble Metal Supported Amount (mass %) |
|---|---|---|---|---|---|---|---|
| Powder 19 | Ce:Zr = 7:3 | 700 | 45 | 18 | 32 | Pd | 0.6 |
| Powder 20 | Ce:Y = 7:3 | 700 | 42 | 18 | 34 | Pt | 0.45 |
| Powder 21 | Ce:La = 7:3 | 700 | 43 | 18 | 32 | Ag | 1.0 |
| Powder 22 | Ce:Sr = 7:3 | 700 | 40 | 17 | 35 | Pt | 0.45 |
| Powder 23 | Ce:Nb = 7:3 | 700 | 38 | 17 | 35 | Pt | 0.45 |
| Powder 24 | Ce:Nd = 7:3 | 700 | 36 | 16 | 40 | Pt | 0.45 |

(Formation of Catalyst Layer on Filter Substrate)

Next, 500 g of the powder 19 was impregnated with a palladium (Pd) nitrate aqueous solution, and the mixture was stirred and dried to remove water, followed by baking in an electric furnace at 400° C. Thus, 0.6% by mass of Pd was supported on the powder 19. Next, 500 g of the 0.6% by mass Pd-supported powder 19 thus obtained and 2500 g of water were mixed. Then, the mixture was put into a magnetic ball mill made of alumina, followed by wet-milling so as to have an average diameter of 2.1 μm, thereby obtaining a catalyst slurry 19 corresponding to the powder 19.

In addition, 500 g of the powder 21 was impregnated with a silver (Ag) nitrate aqueous solution, and the mixture was stirred and dried to remove water, followed by baking in an electric furnace at 400° C. Thus, 1.0% by mass of Ag was supported on the powder 21. Next, 500 g of the 1.0% by mass Ag-supported powder 21 thus obtained and 2500 g of water were mixed. Then, the mixture was put into a magnetic ball mill made of alumina, followed by wet-milling so as to have an average diameter of 2.1 μm, thereby obtaining a catalyst slurry 21 corresponding to the powder 21.

Note that, 0.45% by mass of Pt was supported on the respective powders 20 and 22 to 24 in a similar manner to the above-described process. Then, catalyst slurries 20 and 22 to 24 corresponding to the powders 20 and 22 to 24 were obtained in a similar manner to the above-described process.

Then, a cordierite honeycomb filter substrate was coated with the respective catalyst slurries 19 to 24 in a similar manner to the above-described process, thereby obtaining filter catalysts 19 to 24 in which approximately 50 g/L of a catalyst layer was formed on the filter substrate, respectively. Note that, with respect to the catalyst slurries 19 and 21, the coating amounts were adjusted so as to have the same supported amount of noble metal on the respective filter substrates as the other catalyst slurries.

[Performance Test of Filter Catalyst]

As shown in FIG. 4, the respective filter catalysts 1 to 24 and 2' were placed in an exhaust gas flow path of a 2800 cc six cylinder direct-injection diesel engine manufactured by NISSAN MOTOR CO., LTD., which was constantly operated at a engine speed of approximately 2000 rpm, so that approximately 6 g/L of PM was deposited on the respective filter catalysts. In this test, the inner temperature of the respective filter catalysts was set to 280° C. It has been confirmed that a burning rate of PM is extremely slow at that temperature.

Then, an exhaust gas pipe was shifted to allow exhaust gas of the engine to flow into the respective filter catalysts through an exhaust gas temperature control device installed with a heater, thereby regenerating the respective filter catalysts. More specifically, the engine was operated at a engine speed of approximately 1800 rpm, an inlet temperature of the respective filter catalysts was set to a prescribed temperature (440° C.) by use of the exhaust gas temperature control device, and a pressure loss was measured by each pressure sensor fixed in front of and behind the respective filter catalysts. Then, the amount of time that the pressure loss returned to an initial value was measured, and the weight of the respective filter catalysts was confirmed, thereby calculating a burning rate of the deposited PM (PM oxidation rate) at the prescribed temperature. In the regeneration process of the respective filter catalysts, in order to remove redundant PM flowing into the filter catalysts, a cordierite filter on which no noble metal was supported was provided upstream of the respective filter catalysts.

With regard to the main components of exhaust gas and the concentrations thereof at the time of regenerating the filter catalysts, NOx was 180 ppm or less, NMHC was 100 ppm or less, CO was 800 ppm or less, and $O_2$ was 10 vol %. The fuel used was commercially available JIS Type 2 light oil, and a gas hourly space velocity (GHSV) was approximately 45,000 $h^{-1}$ with respect to the filter catalysts. Note that, NMHC is an abbreviation for non-methane hydrocarbon, and represents a type of hydrocarbon from which methane is removed.

Figure 5:
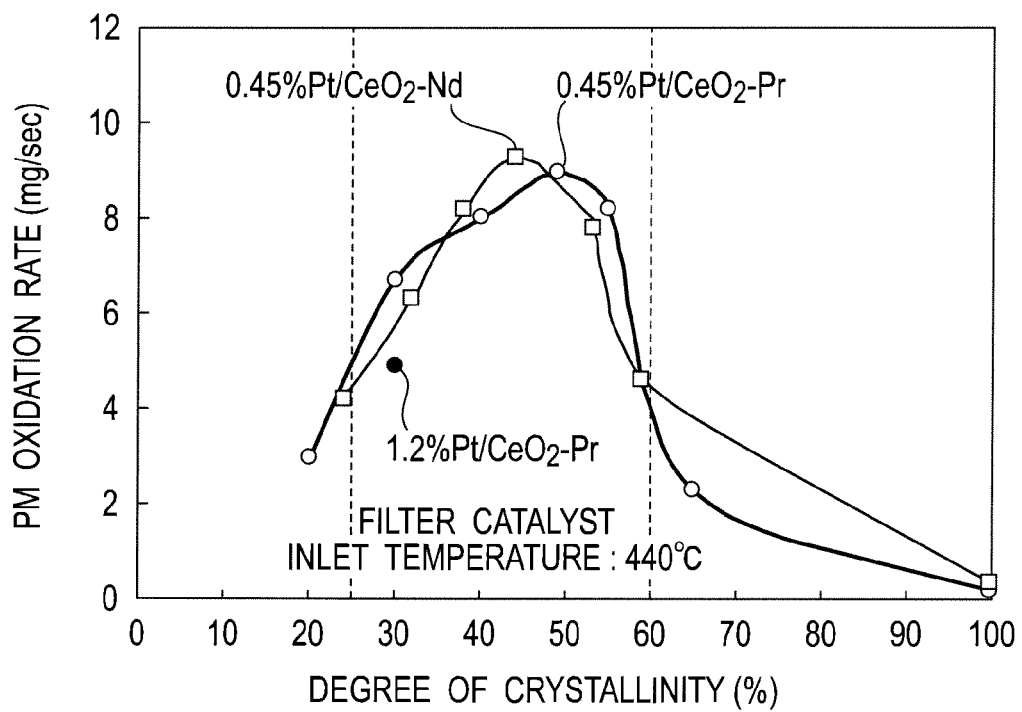
FIG. 5 is a graph showing a relationship between a degree of crystallinity and a PM oxidation rate of a particulate matter purifying material.

FIG. 5 is a graph showing a relationship between the degree of crystallinity and the PM oxidation rate in the respective filter catalysts of the powders 1 to 7 and 2' with regard to the $CeO_2$—Pr composite oxide and the powders 8 to 14 with regard to the $CeO_2$—Nd composite oxide. In the regeneration treatment of the filter catalysts, the exhaust gas temperature at the inlet of the respective filter catalysts was set to 440° C. As shown in FIG. 5, it is recognized that the filter catalysts using the particulate matter purifying material according to the present embodiment (powders 2 to 5 and 9 to 13) achieve a high PM burning rate at 440° C. In this case, it is recognized when the degree of crystallinity in which a crystal growth in the $CeO_2$ (111) plane in the $CeO_2$—Pr composite oxide is parameterized is used, the filter catalysts using the materials with the degree of crystallinity (CR) of 40%, 49% and 55% have a high PM burning rate; on the other hand, the filter catalyst using the material with the degree of crystallinity of 65% has a lower PM burning rate. Similarly, in the case of the $CeO_2$—Nd composite oxide, it is recognized that the filter catalysts using the materials with the degree of crystallinity (CR) of 38%, 44% and 53% have a high PM burning rate.

In the cordierite honeycomb filter catalyst having a porosity of 56%, the pressure loss is increased when the supported amount of the catalyst exceeds 70 g/L. When the supported amount exceeds 100 g/L, the pressure loss becomes uncontrollable. Further, with regard to the influence of the Pt supported amount, it is recognized when the concentration exceeds 1.0% by mass, the burning rate tends to decrease, and therefore, the supported Pt is to be wasted.

Figure 6:
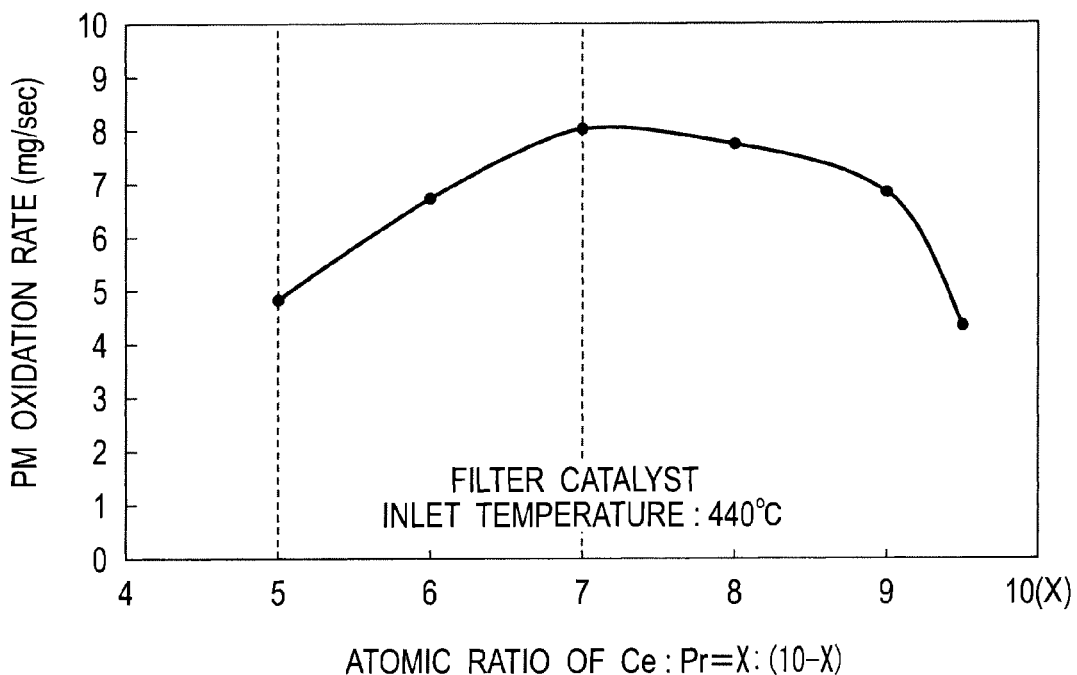
FIG. 6 is a graph showing a relationship between a cerium atomic ratio and a PM oxidation rate in a cerium-praseodymium composite oxide.

FIG. 6 is a graph showing a relationship between the atomic ratio of cerium to praseodymium and the PM oxidation rate in the $CeO_2$—Pr composite oxide on which 0.45% by mass of Pt is supported. Namely, FIG. 6 shows the PM oxidation rate of the respective filter catalysts using the powders 3 and 15 to 18. As shown in FIG. 6, the PM oxidation rate is high within the range of Ce:Pr=6:4 to 9:1. More specifically, the PM oxidation rate shows the maximum value at Ce:Pr=7:3, and compositions with the ratio exceeding Ce:Pr=9:1 and compositions with the ratio below Ce:Pr=6:4 have a lower oxidation rate, respectively.

Figure 7:
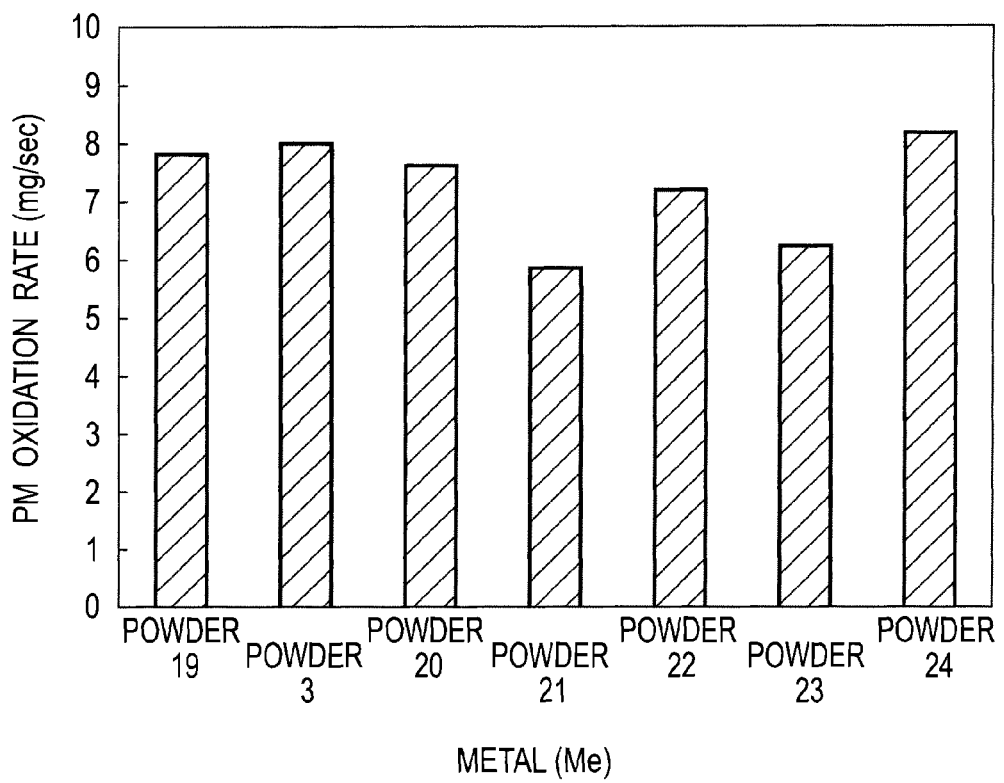
FIG. 7 is a graph showing a relationship between metal and a PM oxidation rate in a particulate matter purifying material.

FIG. 7 is a graph showing a relationship between the type of metal (Me) added to $CeO_2$ and the PM oxidation rate. Namely, FIG. 7 shows the PM oxidation rate of the respective filter catalysts using the powders 3 and 19 to 24. As shown in FIG. 7, it is recognized when zirconium (Zr), yttrium (Y), lanthanum (La), praseodymium (Pr), strontium (Sr), niobium (Nb) and neodymium (Nd) are used as metal (Me), all the filter catalysts show good performance. With regard to the powder 19 using zirconium and the powder 21 using lanthanum on which Pd and Ag are supported as noble metal, respectively, it is recognized that the filter catalysts thereof both show a high PM oxidation rate.

In the embodiment and the examples described above, the solid catalyst material and the supporting conditions to the filter substrate for achieving a sufficient PM burning property are provided. In addition, the appropriate usage conditions of the filter catalyst are also provided, so as to obtain the filter catalyst that can start acting at a low temperature and provide good performance stably for a long period of time. Accordingly, excess fuel consumption can be avoided, and thermal runaway of the filter catalyst due to excessive PM burning can be prevented.

In addition, when focusing on the property of the cerium based material capable of storing and releasing oxygen, it is recognized that even solid particulate matter that generally has a low contact ratio can be burned with high efficiency. Further, it has been confirmed when the material having such a characteristic is supported on the actual monolithic filter substrate, the combination of the depth filtration system using the inner wall of the filter substrate and the surface filtration system that has been conventionally used widely is more effective than the case where the surface filtration system is used independently.

In addition to the above-described matters, the optimal usage of the filter catalyst to maintain the above-described characteristics, namely, the appropriate determination of the temperature and oxygen concentration, can allow PM burning to be performed under a low temperature condition, and can provide the regeneration method by which the above-described characteristics can be maintained for a long period of time. Therefore, the amount of fuel and engine oil consumption can be reduced, and the amount of the noble metal catalyst to be used can be also reduced. Consequently, the internal combustion engine capable of emitting purified exhaust gas can be provided.

The entire content of Japanese Patent Application No. P2008-297932 (filed on Nov. 21, 2008) is herein incorporated by reference.

Although the present invention has been described above by reference to the embodiment and the examples, the present invention is not limited to those, and it will be apparent to these skilled in the art that various modifications and improvements can be made.

INDUSTRIAL APPLICABILITY

According to the present invention, the cerium based material having a predetermined property is used. Therefore, the present invention can provide the particulate matter purifying material that has an excellent particulate matter purifying property and is capable of starting purifying particulate matter at a low temperature and preventing thermal runaway of the filter catalyst, the filter catalyst using the particulate matter purifying material, and the method of regenerating the filter catalyst.

REFERENCE SIGNS LIST

1 Engine
1e Exhaust gas flow path
3 Oxidation catalyst
5 NOx trap catalyst
10 Filter catalyst
12 Filter substrate
12C Cell
12W Cell wall
12Wp Fine pore
20 Catalyst layer
30 Particulate matter (PM)

The invention claimed is:

1. A particulate matter purifying material used for a filter catalyst for purifying exhaust gas containing particulate matter, the filter catalyst being disposed in an exhaust gas flow path of an internal combustion engine, trapping the particulate matter in the exhaust gas generated in the internal combustion engine, and burning the particulate matter, so as to be regenerated, the particulate matter purifying material comprising:
an oxide containing: cerium (Ce) having an oxygen storage-release capacity; and at least one metal (Me) selected from the group consisting of zirconium (Zr), yttrium (Y), lanthanum (La), praseodymium (Pr), strontium (Sr), niobium (Nb) and neodymium (Nd),
wherein a content ratio (Ce:Me) of cerium to the metal is 6:4 to 9:1 in terms of an atomic ratio, and
a degree of crystallinity (CR) represented by the following formula (1) is within a range of 36 to 60%:

$$\text{Degree of crystallinity } (CR) = I/I_0 \times 100(\%) \quad (1)$$

wherein $I$ represents an X-ray diffraction peak intensity with regard to a (111) plane of a $CeO_2$ phase in the particulate matter purifying material, and $I_0$ represents the X-ray diffraction peak intensity with regard to the (111) plane of the $CeO_2$ phase after the particulate matter purifying material is baked in air at 1000° C.

2. The particulate matter purifying material according to claim 1, wherein a crystallite diameter represented by the following formula (2) in compliance with Scherrer's equation is within a range of 10 nm to 22 nm with regard to the (111) plane of the $CeO_2$ phase in the particulate matter purifying material:

$$D = \lambda/\beta \cos \theta (\text{nm}) \quad (2)$$

wherein $\lambda$ represents a measuring X-ray wavelength (nm), $\beta$ represents a full width at half maximum $\beta_{1/2}$ (radian) of a diffraction line according to a crystallite dimension, and $\theta$ represents a Bragg angle of the diffraction line.

3. The particulate matter purifying material according to claim 1, wherein a specific surface area is within a range of 15 to 40 $m^2/g$.

4. A filter catalyst for purifying exhaust gas containing particulate matter that is disposed in an exhaust gas flow path of an internal combustion engine, traps the particulate matter in the exhaust gas generated in the internal combustion engine, and burns the particulate matter, so as to be regenerated, the filter catalyst comprising:
a filter substrate made of porous ceramics having continuous fine pores; and
a catalyst layer formed on a wall of the filter substrate,
wherein the catalyst layer contains: 25 to 100 g/L of a mixture of the particulate matter purifying material according to claim 1 and noble metal; and 0.25 to 1.0 g/L of the noble metal, per unit volume of the filter substrate.

5. The filter catalyst for purifying exhaust gas containing particulate matter according to claim 4, wherein a porosity of the filter substrate is within a range of 42 to 62%.

6. The filter catalyst for purifying exhaust gas containing particulate matter according to claim 4, wherein the filter substrate is cordierite-based, and a porosity thereof is within a range of 56 to 62%.

7. The filter catalyst for purifying exhaust gas containing particulate matter according to claim 4, wherein the filter substrate is made of silicon carbide (SiC), and a porosity thereof is within a range of 42 to 56%.

8. The filter catalyst for purifying exhaust gas containing particulate matter according to claim 4, wherein the noble metal is at least one selected from the group consisting of platinum (Pt), palladium (Pd) and silver (Ag).

9. A method of regenerating a filter catalyst for purifying exhaust gas containing particulate matter, comprising:

preparing the filter catalyst for purifying the exhaust gas containing the particulate matter according to claim 4; and controlling an inner temperature of the filter catalyst to be 800° C. or less, thereby burning and removing the particulate matter deposited on the filter catalyst.

10. The method of regenerating the filter catalyst for purifying exhaust gas containing particulate matter according to claim 9, further comprising:

detecting a deposited amount of the particulate matter on the filter catalyst; and when more than a certain amount of the particulate matter is deposited, controlling a temperature of the exhaust gas at an inlet of the filter catalyst to be 350 to 550° C., and controlling an oxygen concentration to be 8% or more, thereby burning and removing the particulate matter.

* * * * *